United States Patent [19]

Duret

[11] Patent Number: 4,493,946

[45] Date of Patent: Jan. 15, 1985

[54] DEVICE FOR CONNECTING TOGETHER THE OUTER CONDUCTORS OF TWO COAXIAL PAIRS

[75] Inventor: Jean Duret, Lyons, France

[73] Assignee: Les Cables de Lyon, Lyons, France

[21] Appl. No.: 471,905

[22] Filed: Mar. 9, 1983

Related U.S. Application Data

[63] Continuation of Ser. No. 123,245, Feb. 21, 1980, abandoned.

[30] Foreign Application Priority Data

Feb. 23, 1979 [FR] France ............................ 79 04658

[51] Int. Cl.³ ............................ H02G 15/18

[52] U.S. Cl. ............................ 174/88 C; 174/70 S

[58] Field of Search ............................ 174/88 C, 92, 70 S, 174/21 C, 21 JC, 71 C; 339/89 C

[56] References Cited

U.S. PATENT DOCUMENTS

| | | | |
|---|---|---|---|
| 2,425,959 | 8/1947 | Schoenborn | 174/88 C |
| 3,673,314 | 6/1972 | Zimmermann et al. | 174/88 C |
| 3,813,479 | 5/1974 | Olivero | 174/88 C |
| 3,854,003 | 12/1974 | Duret | 174/88 C |
| 3,872,237 | 3/1975 | Eyre et al. | 174/88 C |

FOREIGN PATENT DOCUMENTS

| | | | |
|---|---|---|---|
| 1492978 | 11/1977 | United Kingdom | 174/88 C |

*Primary Examiner*—A. T. Grimley
*Assistant Examiner*—D. A. Tone
*Attorney, Agent, or Firm*—Sughrue, Mion, Zinn, Macpeak, and Seas

[57] ABSTRACT

A device for connecting together the outer conductors of two coaxial pairs with coaxial conductors (3) and outer conductors (4), said device including two metal half-shells (11) with chamfered ends (10) which are provided with longitudinal slots, said half-shells being disposed between the ends of the outer conductors, a sleeve (6) which covers said half-shells and one of whose ends is provided with a tapping (7), and a clamping screw 8 which is screwed onto the end of the sleeve so that by means of a conical ring (9), it clamps one end of each half-shell. The inside of the other end of the sleeve is machined to give it a frusto-conical profile (19) whose conical shape matches that of the corresponding ends (20) of the half-shells. Application to connecting two lengths of coaxial cable or one coaxial cable to the coaxial lead of a repeater.

2 Claims, 3 Drawing Figures

DEVICE FOR CONNECTING TOGETHER THE OUTER CONDUCTORS OF TWO COAXIAL PAIRS

This application is a continuation of application Ser. No. 123,245, filed Feb. 21, 1980, now abandoned.

FIELD OF THE INVENTION

The present invention relates to a device for connecting together the outer conductors of two coaxial pairs with respective axial conductors and outer conductors, at least one of said pairs being a length of coaxial cable, said device including two metal half-shells said half-shells having externally chamfered ends which are provided with longitudinal slots, said half-shells being disposed between the ends of the outer conductors, a sleeve covering said half-shells and having one end tapped and threaded and a clamping screw fitted onto the corresponding outer conductor and being screwed into said one end of the sleeve and bearing on a conical ring to clamp said one end of each half-shell.

BACKGROUND OF THE INVENTION

The Applicant's published U.S. Pat. No. 3,854,003 relates to a connection device of the above type in which the sleeve is tapped at each of its ends, and in which a clamping screw is screwed into each of these ends to clamp the ends of the half-shells by means of conical rings, insulating end members threaded in each of the outer conductors are also disposed inside each end of the half-shells and each being provided with a flange which abuts against the end of the corresponding outer conductor.

Although such a device is suitable for providing the required connection, it is rather complex, its cost is high and assembling the device is a relatively long and tricky process (in particular because it requires the tightening to be shared between the screws). Also, each insulating end member sets up a big variation of characteristic impedance of the cable.

The present invention aims to remedy these drawbacks and to provide a simpler, less expensive device which is more rapid and easier to assemble, and which does not modify characteristic impedance of the cable.

SUMMARY OF THE INVENTION

The device according to the invention is characterized in that the inside of the other end of said sleeve is machined to give it a frusto conical profile whose conical shape substantially matches that of the corresponding chamfered ends of the half-shells, the inner peripheral portion of each of the ends of the metal half-shells being provided which grooves in which insulating washers are inserted, said half-shell ends being recessed internally at respective ends, and a metal ring for clamping the outer conductor against the half-shell being provided within respective recesses at the ends of said metal half-shells, axially outside the groove in which the insulating washer is inserted and in contact with the inner part of the end of the conductor, whereby the characteristic impedance of the cable is substantially unaffected by the clamping of the half-shell against the outer conductor.

In the case of connecting a coaxial cable to a coaxial pair of smaller diameter, in particular to the coaxial flexible lead of a repeater. on the smaller diameter coaxial pair side, said end member is provided with internal gas-tight seals inserted in internal grooves of said end member and an adhesive heat-shrinkable sheath which surrounds the end of said end member which is opposite to the half-shell, and it also includes a metal adaptor sheath which surrounds the axial conductor of the flexible lead repeater beyond the end member, said adapter sheath also having an outside diameter equal to that of the axial conductor of the coaxial cable.

A connection for a coaxial line cable and a connection, in accordance with the invention, for connecting a coaxial cable to the coaxial lead of a repeater are described herein-after by way of example and with reference to the figures of the accompanying drawing.

Figures 1, 2:
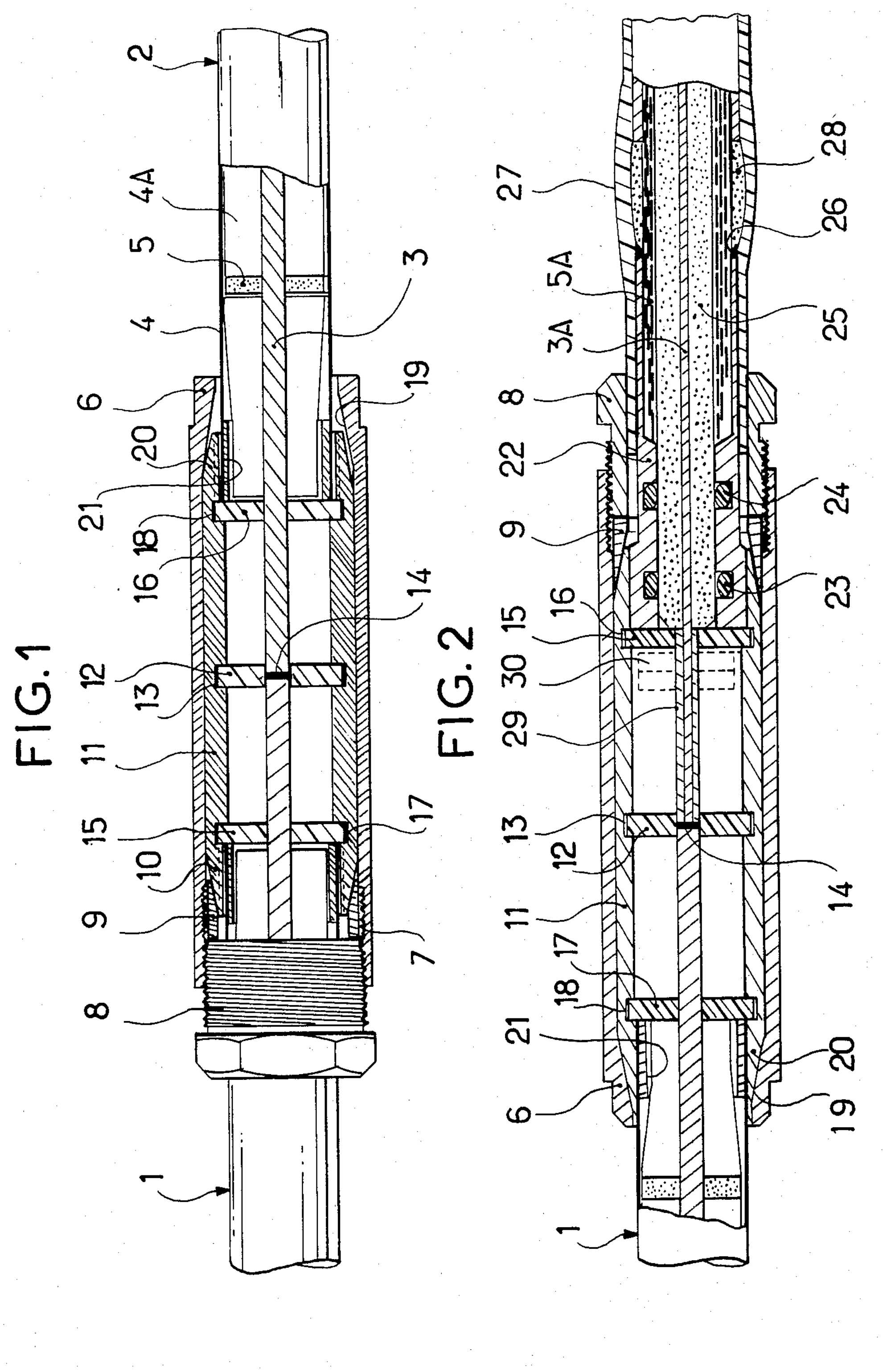
FIG. 1 is a partial axial cross-section of a line connection between two coaxial cables of the same diameter.
FIG. 2 is an axial cross-section of a connection of a coaxial cable to the coaxial lead of a repeater.
Figure 3:
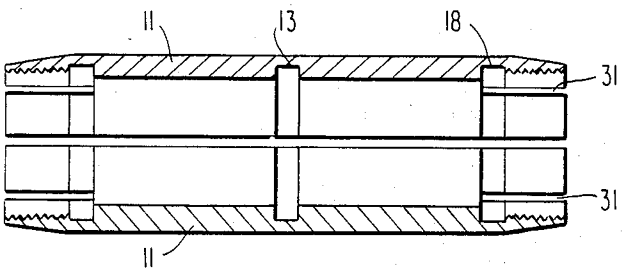
FIG. 3 is a sectional view of the metallic sleeve forming a part of the connection of FIG. 1.

The connection illustrated in FIG. 1 interconnects coaxial cables 1 and 2; the second cable 2 being shown in axial cross-section. These cables include an axial conductor such as 3 and an aluminium outer conductor such as 4, separated by insulation 4A and connected at intervals by insulating spacer disks 5. The connection between the cables includes a light alloy (compatible with the aluminium of the outer conductors of the coaxial cable) one of whose ends (here, the left-hand end) is tapped and threaded at 7 to receive a hollow clamping screw 8 made of the same alloy. Said screw clamps the conical end 10 of half-shells 11 by means of a conical ring 9. The half-shells 11 have externally chamfered ends 10 which are provided with longitudinal slots 31, FIG. 3.

In the mid-portions of the light alloy half-shells, there is a polytetrafluoroethylene insulating centering washer 12 for centering the conductors. Said washer is recessed in an inside groove 13. The axial conductors are connected together by brazing, soldering or crimping at 14 by a known method. End insulating washers 15 and 16 also made of polytetrafluoroethylene and against which the insulation of the cables presses are recessed in inside grooves 17 and 18 in each end of the half-shells and before the frusto-conical portions thereof.

The other end of the sleeve 6 has a frusto-conical inner portion 19 against which the frusto-conical ends 20 of the half-shells are pressed by the clamping of the screw 8.

Lastly, the ends of the outer conductors are held in good contact with the half-shells by steel and rings 21 which press against the end rings of the half-shells such as 16.

It is seen that the sleeve 6 is a relatively simple part which has only one tapping and that the connection is clamped by a single screw 8 which presses against the half-shells by a single conical ring 9. The connection is simpler and less bulky than a known connection with two clamping screws.

In the connection illustrated in FIG. 2 between a coaxial cable and the coaxial flexible lead of a repeater, the left-hand side of the figure, on the coaxial cable side, is analogous to the right-hand side of FIG. 1. The frusto-conical end 20 of the half-shells is clamped against the frusto-conical inner portion 19 of the sleeve.

The coaxial flexible lead of the repeater includes an axial conductor 3A and an outer conductor 5A separated by insulating material 25. The end of the insulating material engages in the bore of a tinned brass end piece 22 (the tinned brass being compatible with the tinned copper of the braiding of the outer conductor) which is provided with two 0 rings 23 disposed in inside grooves 24, said 0 rings providing gas-tight sealing. The right-hand end of an end member is soldered at 26 to the braid which forms the outer conductor of the coaxial flexible lead. The other end of the end member is inserted between half-shells 11 and abuts against the insulating end washer 15. The end of the coaxial flexible lead is also surrounded by an adhesive heat shrinkable sheath 27 which also surrounds the end of the end member, a stretched self-bonding tape 28 surrounding the insulating material of the coaxial flexible lead up to the inside of the end member 22.

The main function of the end member 22 is to provide electrical continuity between the outer conductor of the coaxial flexible lead of the repeater and the connection. However, it also matches the dimensions of the outer conductor, while providing both mechanical reinforcing means necessary for withstanding the pressure due to clamping on the end of the coaxial flexible lead, and longitudinal gas-tight sealing due to its 0 rings and to the adhesive heat shrinkable sheath.

The difference in diameter between the axial conductors of the coaxial cable and of the coaxial flexible lead of the repeater, in its portion beyond the insulating washer 15 is compensated by surrounding the axial conductor of the flexible lead of the repeater with a bronze adaptor sheath 29 which is soldered or brazed at 14 to the axial conductor 3A to the end of the axial conductor of the coaxial cable.

Capacitance compensation can be provided by disposing one or several split polyethylene or polytetrafluoroethylene disks 30 around the adaptor sheath, beside the insulating washer 15.

Although the connection devices which have just been described with reference to the figures appear to be the preferable embodiments, it will be understood that various modifications can be made thereto without going beyond the scope of the invention, it being possible to replace some of their components by others which perform the same technical function.

I claim:

1. A device for connecting together the outer conductors of two coaxial pairs with respective axial conductors (3) and outer conductors (4), at least one of said pairs being a length of coaxial cable, said device including two metal half-shells (11), said half-shells having externally chamfered ends (10) which are provided with longitudinal slots, said half-shells being disposed between the ends of the outer conductors, a sleeve (6) covering said half-shells and having one end (7) tapped and threaded, and a clamping screw (8) fitted onto the corresponding outer conductor and being screwed into said one end of the sleeve and bearing on a conical ring (9) to clamp said one end of each half-shell, the improvement wherein the inside of the other end of said sleeve is machined to give it a fustoconical profile (19) whose conical shape substantially matches that of the corresponding chamfered ends (20) of the half-shells, and wherein said device connects said coaxial cable to a flexible lead repeater comprising a coaxial pair of smaller diameter, and wherein said device includes a metal end member (22) to the smaller diameter coaxial pair side which fits into the ends of the half-shells, said end member being provided with internal gas-tight seals (23) and an adhesive heat-shrinkable sheath (27) which surrounds the end of said end member which is opposite to the half-shells.

2. A device according to claim 4, further including a metal adaptor sheath (29) which surrounds the axial conductor (3A) of the flexible lead repeater beyond the end member, said adaptor sheath also having an outside diameter equal to that of the axial conductor of the coaxial cable (1).

* * * * *